Figure 1:
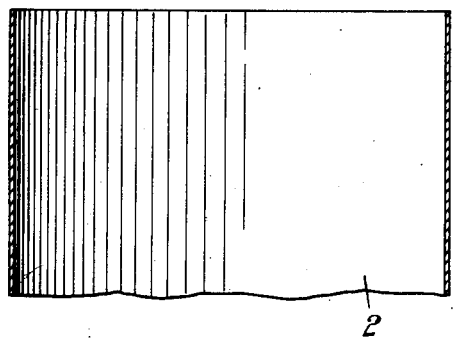

Oct. 17, 1933.   J. E. ANNEN   1,930,963
CONTAINER AND METHOD OF MAKING SAME
Filed May 7, 1931

INVENTOR
James E. Annen
by
his attorneys

Patented Oct. 17, 1933

1,930,963

UNITED STATES PATENT OFFICE

1,930,963

CONTAINER AND METHOD OF MAKING SAME

James E. Annen, Cudahy, Wis., assignor to National Paper Can Company, Cudahy, Wis., a corporation of Delaware Application May 7, 1931. Serial No. 535,648

8 Claims. (Cl. 229—5.6)

This invention relates broadly to the art of making containers, and more particularly to an assembled container structure and a method of making or assembling such structure. It relates still more particularly to the manufacture of containers provided with closures comprising a plurality of closure members connected with the container body to close the same at one or both ends.

The invention, while not so limited, is particularly applicable to the manufacture of containers out of fibrous material, and especially containers comprising a body blank into an extremity of which the closure members are adapted to be inserted in forming the closure. In the manufacture of containers of this type the most important consideration is that the closure shall be liquid-tight and strongly constructed so as to minimize the probability that the closure will be damaged in handling so that leakage will occur.

Another very important consideration in making containers of the type mentioned is that the cost of making them shall be as low as possible and that the manufacturing operations shall be capable of being carried out at high speed. It is now customary to manufacture such containers by means of automatic machinery capable of making from sixty to one hundred containers per minute with no appreciable manual handling.

One of the objects of the present invention is to provide a container having an exceptionally strong, durable and liquid-tight closure. Another object is to provide a method of manufacturing a container having a closure formed of two closure members adapted to be inserted into the container body and connected therewith, such method being susceptible of being carried out on suitable automatic high speed apparatus at low cost.

In the copending application of George O. Frostad, Serial No. 528,828, filed April 9, 1931, there are disclosed and claimed a method of and apparatus for performing mechanical operations on moving work, which method and apparatus are particularly adapted for the manufacture of containers of the type herein disclosed.

I provide a container having a reversely turned wall, a flanged closure member within the wall, the flange of such closure member being at least partially disposed outside the reversely turned wall portion, and a second closure member within the wall, lying against the first mentioned closure member and bearing against the reversely turned wall portion, the reversely turned wall portion being beaded adjacent the periphery of the second closure member to assist in maintaining the same in position. I further provide a container having a reversely turned wall and a plurality of closure members within the wall, the reversely turned wall portion having a bead lying between and spacing apart portions of the respective closure members.

I also provide in a method of making a container, the steps comprising inserting a closure member into a container body, turning inwardly the extremity of the body, beading such inturned extremity, and inserting a second closure member against the bead. I still further provide in a method of making a container, the steps comprising inserting a flanged closure member into a container body, depressing the closure member adjacent the flange, turning and tucking the extremity of the container body within the depression, beading the inturned body extremity within the depression, and inserting a second closure member against the bead.

Other objects and advantages of the invention will become apparent as the following description of a present preferred embodiment thereof proceeds.

Figure 4:
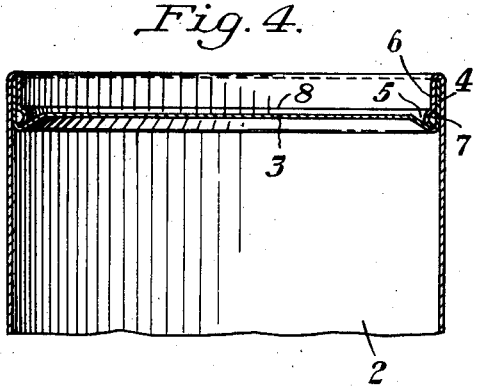
Figure 5:
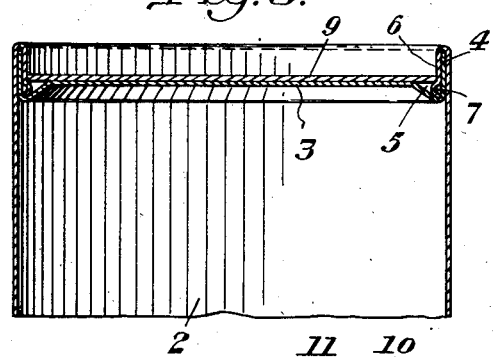
Figure 6:
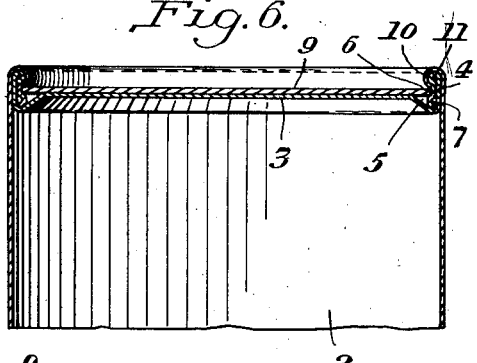
Figure 7:
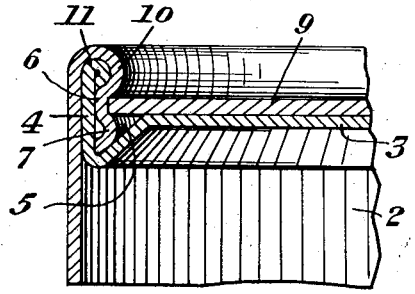

In the accompanying drawing I have illustrated a present preferred embodiment of the invention, wherein Figures 1 to 6, inclusive, are, respectively, partial central vertical sectional views of a body blank and closure blanks at several stages during the formation of a container, Figure 6 illustrating the finished container; and Figure 7 is an enlarged partial central vertical sectional view showing a portion of the finished container as illustrated in Figure 6.

Referring more particularly to the drawing, there is provided a cylindrical fibrous body blank 2 which is preferably cut from a long preformed fibrous tube in a manner well known in the art. For any given size of container to be manufactured the body blanks are cut from tubes of a desired diameter and to a desired length. Inasmuch as the diameter or length of the body blank 2 has no bearing on the present invention, only a portion of such blank is shown in the respective figures of the drawing.

Figure 2:
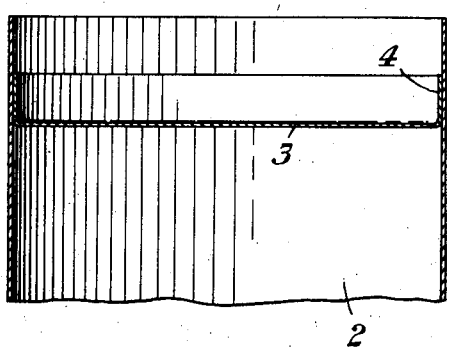

A flanged inner closure member 3 is first inserted into one end of the body blank 2, such closure member 3 having an annular flange 4 extending substantially perpendicularly to the body of the closure member, the external diameter of the flange portion 4 being such that the member may snugly fit within the body blank 2, as shown in Figure 2. The inner closure member 3 is inserted into the body blank 2 with the flange 4 toward the nearest extremity of the body blank, and the outer end of the flange is spaced from such extremity of the body blank a distance slightly greater than the height of the flange, for a purpose to be presently described.

Figure 3:
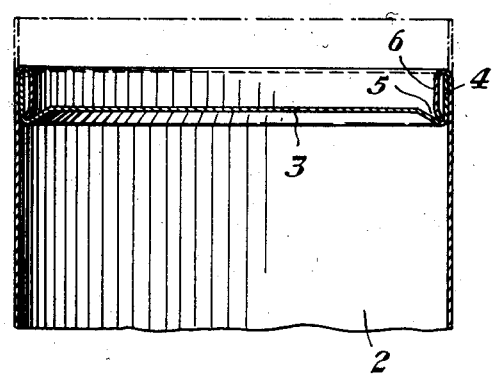

Although the container may be manufactured in various different ways, I prefer to use a cylindrical mandrel whose diameter is substantially the same as the external diameter of the flange portion 4 of the inner closure member 3 and which mandrel, therefore, is adapted to snugly receive over its curved surface the container body blank 2. The upper peripheral edge of the mandrel is preferably beveled so that the mandrel serves as a pattern over which the inner closure member 3 may be compressed to form in such inner closure member adjacent the flange 4 an annular depression 5. Such annular depression 5 may conveniently be formed by the use of a spinning tool of well known construction, which spinning tool coincidentally spins inwardly and downwardly the extremity 6 of the body blank 2 and forms the annular depression 5 in the inner closure member 3, as shown in Figure 3. The original position of the wall extremity 6 is indicated in chain lines in Figure 3. During such operation the end of the body blank is tucked within the annular depression formed in the inner closure member, but the inturned wall extremity of the body blank is loosely positioned, as shown in Figure 3, until the succeeding operation is performed.

The body blank and inner closure member are next subjected to a compressing or expanding operation which squeezes together substantially radially of the body blank the outer wall thereof, the flange 4 and the inturned wall extremity 6, as shown in Figure 4. The inturned wall portion 6 is preferably, as above suggested, slightly longer than the flange 4 so that during the expanding operation an inwardly projecting annular bead 7 is formed at the extremity of the portion 6. The expanding operation is preferably performed by a suitable expanding die or tool which may be of well known construction, such die being shaped to form the bead 7 with its upper edge 8 (Figure 4) slightly above the upper surface of the body of the inner closure member 3.

An outer closure disc 9 is next inserted into the inturned body wall extremity 6, as shown in Figure 5. The disc 9 is flat throughout its entire extent and is preferably of somewhat heavier material than the inner closure member 3. The diameter of the disc 9 is such that it fits snugly within the inturned body wall extremity 6, assisting in pressing together such inturned wall extremity, the flange 4 of the inner closure member 3 and the outer wall of the body. The disc 9 is pressed down into the body outside the closure member 3 and against the bead 7, forcing and compressing such bead until it lies substantially entirely within the annular depression 5 and until the disc 9 lies substantially flat against the body of the inner closure member 3.

The container shown in Figure 5 is itself a practicable and usable article without further refinement, but I prefer to additionally strengthen the closure by spinning in the extremity thereof so as to form a bead 10 (Figure 6) outside the outer closure disc 9, which bead serves to maintain such disc in place and cooperates with the inner bead 7 to insure proper positioning thereof. This operation may be performed by a suitable spinning tool of well known construction similar to that used for performing the initial spinning operation but whose die face is appropriately shaped. The bead 10 is pressed inwardly and downwardly against the periphery of the disc 9 and is opposed, not only by the inner bead 7, but also by the flat body portion of the inner closure member 3, the two beads and the body portion of the inner closure member cooperating to maintain the outer disc 9 in proper position and to strengthen the closure as a whole.

The outer bead 10 is strengthened by a core 11 (Figures 6 and 7) formed at the extremity of the flange 4 during the second spinning operation. Thus the outer bead is substantially solid and tightly compressed against the disc 9 and is suitable not only for maintaining the integrity of the closure, but also for serving as a bottom or base for the container and is strong enough to withstand considerable rough usage.

Whenever leakage occurs in fibrous containers of the general type above described it is usually by reason of the loosening of the joint between the body of the container and the closure member or members, giving the liquid within the container an opportunity to seep between the container body and the closure means and leak out of the bottom of the container. Any reasonable chance of leakage is practically eliminated in the construction above described, as the liquid would have to traverse a long and devious path between closely compressed portions of the body and the closure members before it could reach the exterior of the container.

Another advantage of the construction above described resides in the fact that the exterior wall of the container is uninterrupted axially, thus providing a finished product which is smooth from end to end. The internal beads are formed without the necessity of producing a bead in the exterior of the container as is common practice in prior constructions of similar nature.

While I have shown and described a present preferred embodiment of the invention, it is to be distinctly understood that the same is not limited thereto, but may be otherwise variously embodied and practiced within the scope of the following claims.

I claim:

1. A container having a wall axially uninterrupted exteriorly of the container, such wall being reversely turned interiorly of the container, and a plurality of closure members within the wall, the reversely turned wall portion being bulged radially inwardly of the container intermediate portions of said closure members to assist in maintaining the respective closure members in position.

2. A container having a closure member a portion of which adjacent its periphery is depressed substantially in the direction of the container body, the extremity of the container wall being reversely turned and tucked within such depression, a second closure member against the wall and outside the first mentioned closure member, and a plurality of radially inwardly projecting beads in the reversely turned wall portion assisting in maintaining the respective closure members in position.

3. A container having a closure member a portion of which adjacent its periphery is depressed substantially in the direction of the container body, the extremity of the container wall being reversely turned and tucked within such depression and having a bead terminating axially outwardly of the container substantially in the transverse plane of the outer face of such closure member, and a second closure member lying against the outer face of the first mentioned closure member and whose periphery lies against said bead.

4. A container having a closure member a portion of which adjacent its periphery is depressed substantially in the direction of the container body, the extremity of the container wall being reversely turned and tucked within such depression, such inturned wall extremity having a bead extending radially inwardly of the container, and a second closure member outside the first mentioned closure member and outside said bead and whose periphery lies against said bead.

5. A container having a closure member a portion of which adjacent its periphery is depressed substantially in the direction of the container body, the extremity of the container wall being reversely turned and tucked within such depression, such inturned wall extremity having a plurality of beads extending radially inwardly of the container, one of such beads lying at least partially within the depression in such closure member, and a second closure member outside the first mentioned closure member and whose periphery lies between said beads.

6. In a method of making a container, the steps comprising inserting a flanged closure member into a container body, depressing the closure member adjacent the flange, turning and tucking the extremity of the container body within the depression, beading the inturned body extremity within the depression, and inserting a second closure member against the bead.

7. In a method of making a container, the steps comprising inserting a flanged closure member into a container body, depressing the closure member adjacent the flange, turning and tucking the extremity of the container body within the depression, beading the inturned body extremity within the depression, inserting a second closure member against the bead, and beading the body outside the second mentioned closure member.

8. A container having an externally smooth wall with a portion thereof at an end of the container reversely turned inwardly of the container, a flanged closure member having at least a portion of its flange lying between an outer portion of the wall and the reversely turned portion thereof, and a second closure member within the wall and bearing against the reversely turned wall portion, the material of the reversely turned wall portion being bent generally toward and then generally away from the axis of the container adjacent the second closure member to assist in supporting and positioning the same.

JAMES E. ANNEN.